(12) United States Patent
Saib et al.

(10) Patent No.: US 6,230,322 B1
(45) Date of Patent: *May 8, 2001

(54) MUSIC CHANNEL GRAPHICAL USER INTERFACE

(75) Inventors: Joseph Saib, Englewood, CO (US); Lubric Legrand, La Jolla, CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,845

(22) Filed: Nov. 5, 1997

(51) Int. Cl.[7] .................................................. H04N 5/445
(52) U.S. Cl. ................................................ 725/40; 348/43
(58) Field of Search ........................... 455/155.1, 156.1, 455/157.2, 158.2, 158.4, 158.5; 348/906, 563, 569, 729, 738; 345/978, 328, 327

(56) References Cited

U.S. PATENT DOCUMENTS 5,581,621 * 12/1996 Koyama et al. .................... 381/103
5,784,095 * 8/1998 Robbins et al. ...................... 348/6
5,790,958 * 8/1998 McCoy et al. ...................... 455/557

* cited by examiner

Primary Examiner—Victor R. Kostak
(74) Attorney, Agent, or Firm—Blakely, Sokoloff, Taylor & Zafman LLP

(57) ABSTRACT

The present invention relates to an entertainment system and method for selectively adjusting an audio parameter of a currently broadcast audio program. The system comprises a display monitor, having a screen menu including an information area on a first portion of the display. The information area displays a plurality of textual information regarding a currently broadcast audio program. The screen menu also includes a parameter area on a second portion of the display, which displays a status of a parameter corresponding to the currently broadcast audio program. An adjustment mechanism adjusts the status of the parameter, so that the parameter area is updated to display the corresponding adjusted status of the parameter. A broadcast receiver coupled to the display monitor includes a front-end unit capable of receiving and broadcasting programming data associated with an audio program and corresponding video information for viewing on the display monitor.

20 Claims, 5 Drawing Sheets

MUSIC CHANNEL GRAPHICAL USER INTERFACE

BACKGROUND OF THE INVENTION

1. Field of the Invention

The present invention relates in general to electronic systems and more particularly, to a system and method for providing a music channel graphical user interface.

2. Description of Art Related to the Invention

Over the last few years, there has been a growing demand for entertainment systems working in conjunction with various types of broadcasting systems. One type of entertainment system includes a broadcast satellite system; namely, a digital satellite system (DSS). Normally, a DSS comprises an antenna, an integrated receiver decoder (IRD) and a television receiver (TV). Also, the DSS may include an analog video cassette recorder (VCR) to receive analog data for recording purposes. The operations of the IRD are controlled by a remote control.

The antenna receives and routes digital bit streams to the IRD. Typically, a digital bit stream includes sensory data (e.g., video and/or audio) and programming data for one or more shows and/or programs. Upon receiving a first command from the remote control, the IRD generates an "electronic guide screen" displaying programming data for each show capable of being received by the DSS. FIG. 1A illustrates a typical format as provided by the electronic guide screen 100. The user may select shows from any of the listed channels for viewing or listening. These channels include video channels (such as ESPN and CNN) and audio channels (such as the music channel(s)).

Currently, the DSS Music Choice channels only broadcast audio information such as songs. Sometimes, video information or text describing the songs, the associated album and/or artist is also broadcast. When only audio information is broadcast, the electronic guide screen 100 becomes blank, and when corresponding video information is also broadcast, the electronic guide screen 100 displays textual information regarding the currently featured song, as shown in FIG. 1B. As a result, the electronic guide screen 100 remains underutilized and the associated processor is idle since little or no information is displayed. More importantly, there is no means for the user to control the various audio features of the song that is currently being broadcast, since the audio information is provided to the user as received.

Accordingly, there is a need in the technology for an apparatus and method for providing a graphical user interface for use with a music channel, so that user interactivity and control of various audio features of audio information that is being broadcast, may be facilitated.

SUMMARY OF THE INVENTION

The present invention relates to an entertainment system and method for selectively adjusting an audio parameter of a currently broadcast audio program. The system comprises a display monitor, having a screen menu including an information area on a first portion of the display. The information area displays a plurality of textual information regarding a currently broadcast audio program. The screen menu also includes a parameter area on a second portion of the display, which displays a status of a parameter corresponding to the currently broadcast audio program. An adjustment mechanism adjusts the status of the parameter, so that the parameter area is updated to display the corresponding adjusted status of the parameter. A broadcast receiver coupled to the display monitor includes a front-end unit capable of receiving and broadcasting programming data associated with an audio program and corresponding video information for viewing on the display monitor.

DESCRIPTION OF THE PREFERRED EMBODIMENT

In its preferred embodiment, the present invention relates to a system and method for directly interacting with and/or controlling currently broadcast audio information on a music channel.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. While certain illustrative embodiments are described in order to convey the spirit and scope of the present invention, such embodiments should not be construed as a limitation on the scope of the present invention.

Figure 1A:
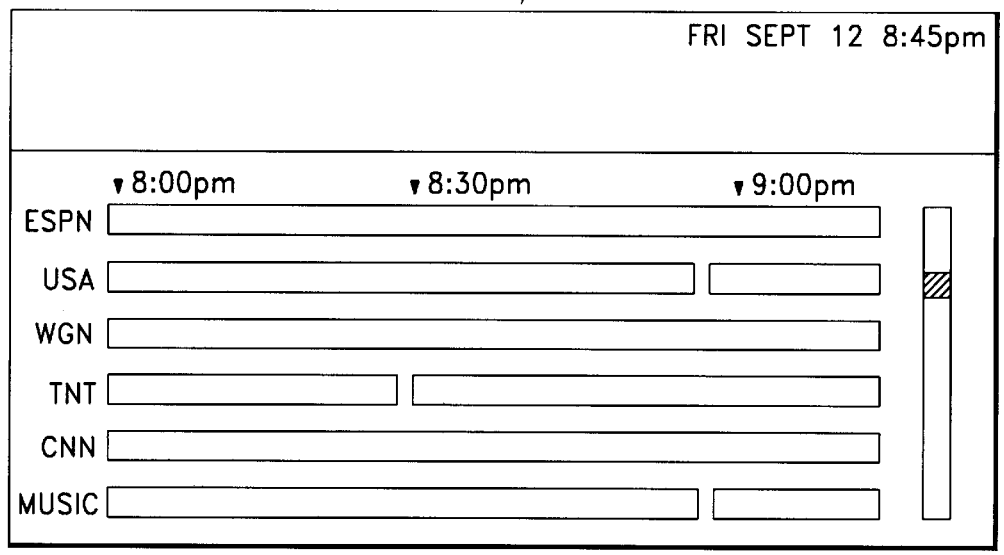
FIG. 1 is a conventional electronic guide screen displayed on a television receiver providing textual information of a song that is currently being broadcast.
Figure 1B:
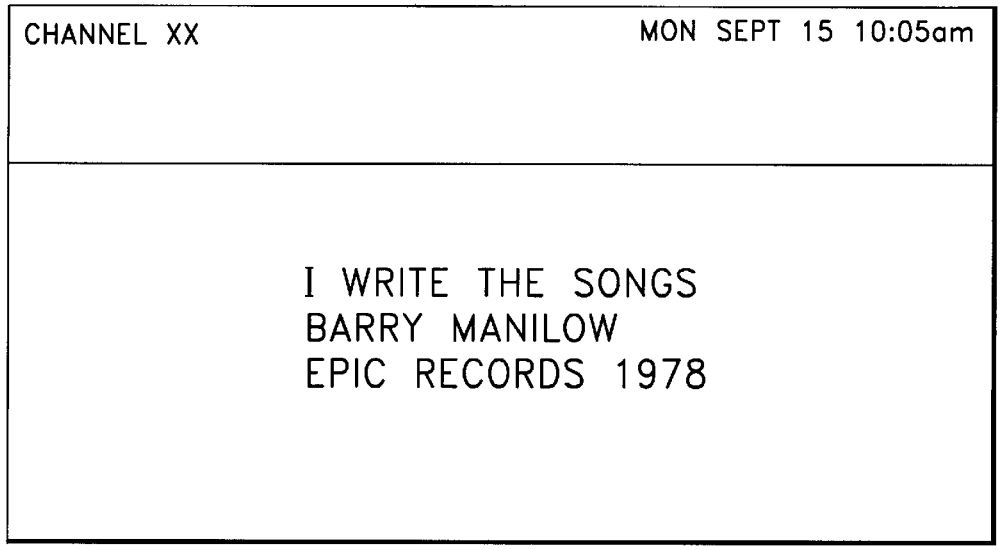
Figure 2:
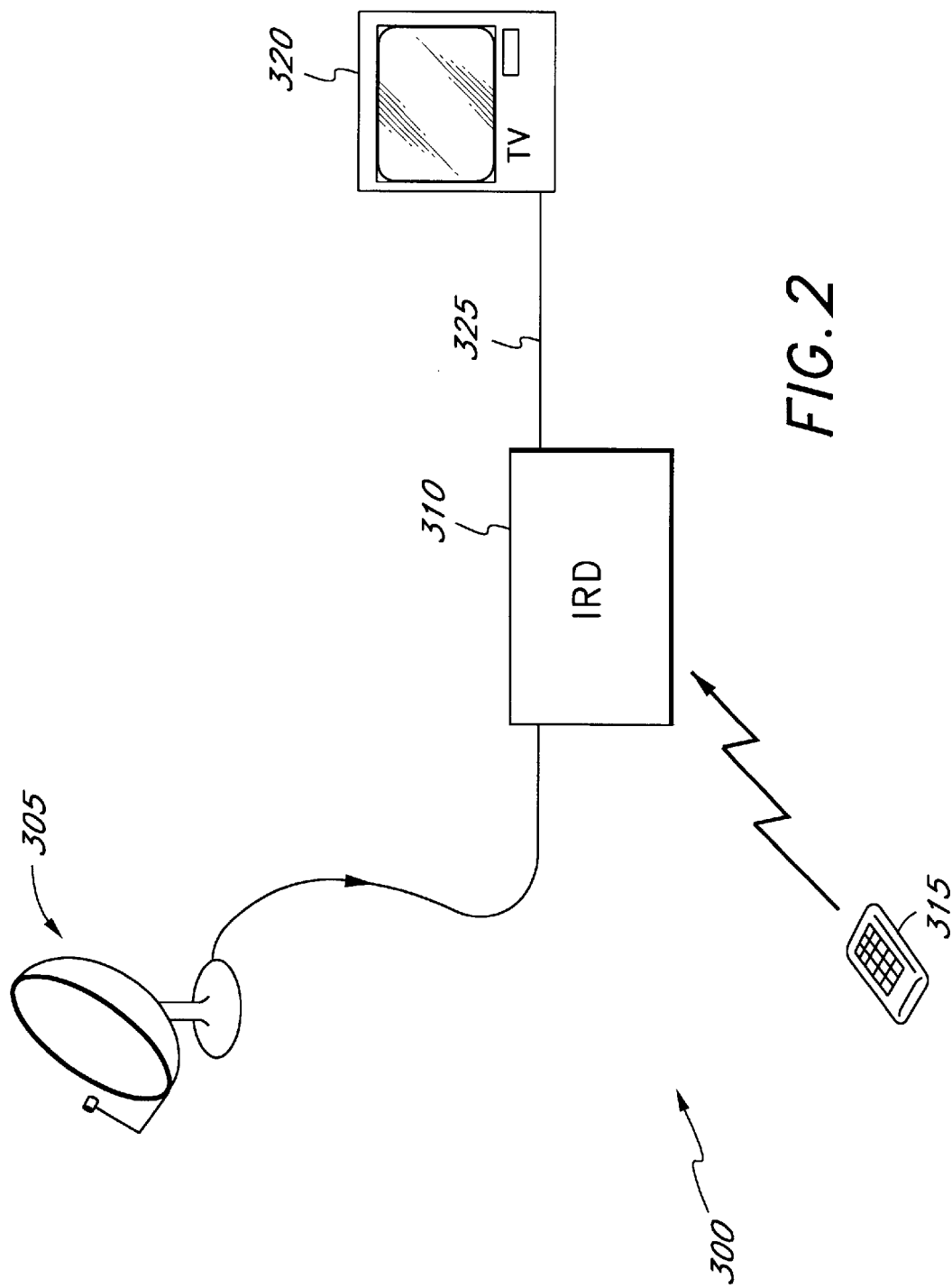
FIG. 2 is an illustrative embodiment of an entertainment system utilizing the present invention.

Referring to FIG. 2, one embodiment of an entertainment system utilizing the present invention is shown. The entertainment system 300 comprises an antenna 305, a broadcast receiver 310 such as an integrated receiver decoder (IRD) for example, and at least one analog-input peripheral device (e.g., a display monitor such as television receiver (TV) 320. The broadcast receiver, in general, receives a broadcast signal (for example, a digital bit stream) and performs operations on the broadcast signal to produce digital and/or analog information. Although the IRD is implemented as the broadcast receiver in this embodiment, other types of broadcast receivers may be used such as a cable box for a Cable Broadcasting System, an Internet terminal, a digital satellite system (DSS) computer and the like.

Antenna 305 receives the digital bit stream from an orbiting satellite (not shown) and routes the bit stream to IRD 310. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows.

IRD 310 is responsible for decoding the bit stream, for storing data in memory accessible by the graphical user interface (GUI) software in accordance with the teachings of the present invention and as executed by IRD 310, and for processing the decoded bit stream to produce one or more output signals having the appropriate electronic GUI screen format. As shown, an output signal is placed in an analog format and sent via communication line 325 to TV 320 for viewing. The analog format may be in accordance with a video format established by National Television Systems Committee (NTSC), or perhaps other video formats, including but is not limited or restricted to Phase Alternating Line (PAL), Sequential Couleur avec Memoire (SECAM) and other recognized formats.

The GUI software is coded to support a data structure having a plurality of parameters. Upon executing the GUI software to provide an interface for a music program (e.g., tune to a channel of a purchased show, control of various audio parameters, etc.), each parameter is loaded with a portion of programming data associated with that program. For example, a first parameter of the data structure is loaded with the title of a song while other parameters are loaded with the volume parameters of the broadcast, the broadcast channel number, and the frequency spectrum of the song.

Additionally, IRD 310 is responsible for responding to a plurality of commands from a remote control 315. Remote control 315 may include any type of remote control, including one described in U.S. Pat. No. 5,453,758 assigned to Sony Corporation of Tokyo, Japan. Examples of commands from remote control 315 include a first command causing IRD 310 to produce an output signal displaying at least an electronic GUI screen on TV 320 corresponding to a selected music channel. Likewise, a second command facilitates selection of one of a plurality of audio parameters, such as base, treble, balance, fade and volume. Upon selection of one of the audio parameters, the user may utilize a set of keys in the remote control 315, such as the volume control keys (VOL+ and VOL− keys) to facilitate adjustment of the audio parameters. Upon setting the desired values for a selected audio parameter, the user may utilize the remote control 315 to issue another command to select a further audio parameter for adjustment.

Figure 3:
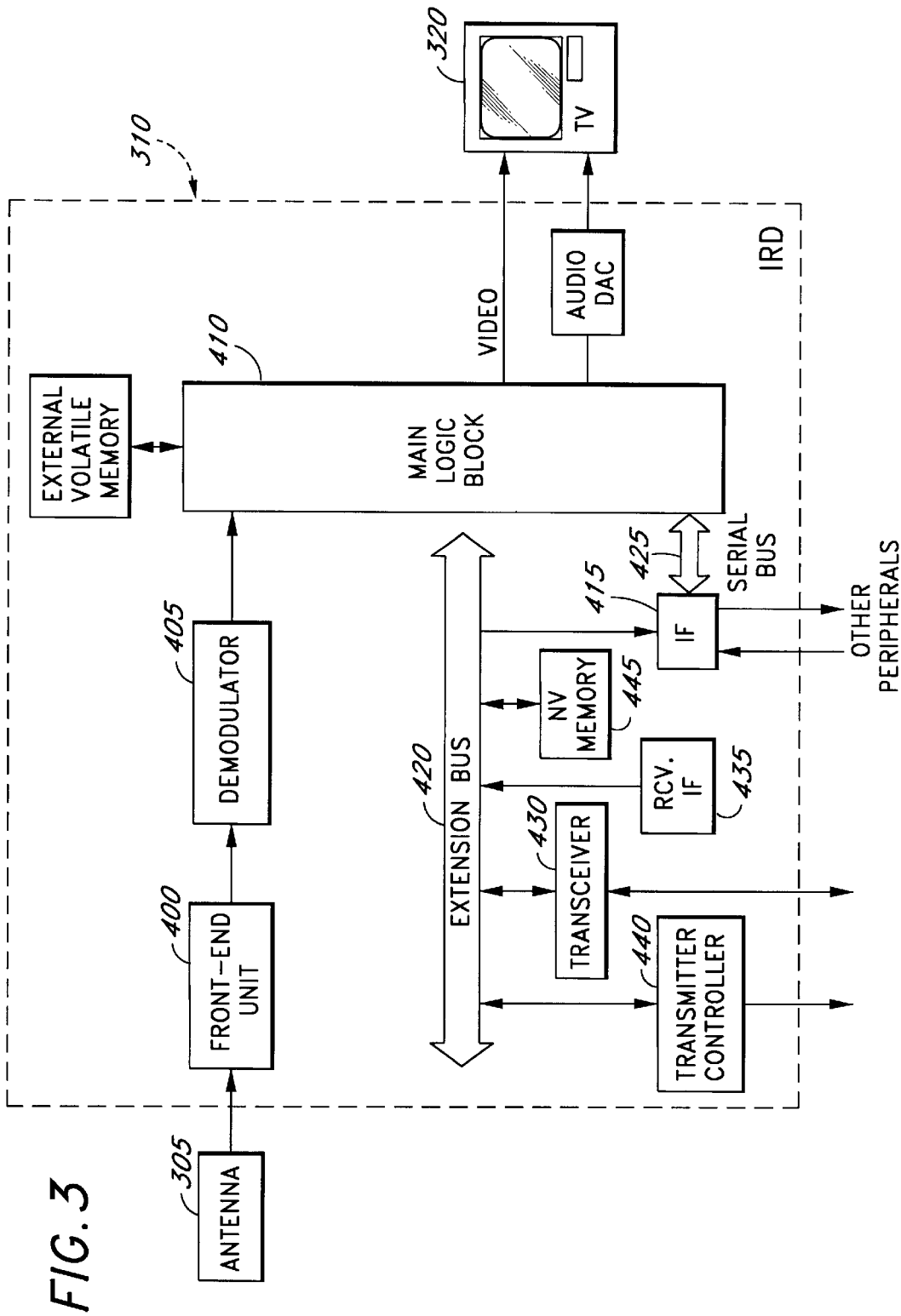
FIG. 3 is a detailed block diagram of one embodiment of an integrated receiver decoder implemented within the entertainment system of FIG. 3.

Referring now to FIG. 3, one embodiment of an integrated receiver decoder (IRD) 310 is shown. The antenna 305 transfers the bit stream to a front-end unit 400 of the IRD 310. Although not shown, the front-end unit 400 includes (i) amplification circuitry used to amplify any relatively weak signals received at antenna 305, and (ii) a tuner which allows a user to receive a desired broadcast channel.

For the case where the user wishes to listen to a channel and view the corresponding graphics or text provided by the digital satellite system service provider, the bit stream associated with the desired broadcast channel is routed from front-end unit 400 to a demodulator 405. In demodulator 405, the bit stream is initially processed before transferring to a main logic block 410 for further processing. Such initial processing may include exposing the bit stream to QPSK-demodulation, viterbi-decoding, de-interleaving and Reed-Solomon decoding.

In certain situations, IRD 310 is connected to other peripheral devices though an interface (IF) 415. In this embodiment, IF 415 may include a link layer integrated circuit (IC) and a physical layer IC (not shown) and complies with the IEEE standards document 1394 entitled "Standard for High Performance Serial Bus" (hereinafter referred to as "IEEE 1394"). This enables IRD 310 to connect to digital-input peripheral devices such as digital VCRs, digital video disk players, digital laser disk players and the like. These digital-input peripheral devices communicate with a central processing unit (CPU) within main logic block 410 (see FIG. 4) through IF 415 and either extension bus 420 or alternatively an IEEE 1394 serial bus 425.

Referring still to FIG. 3, extension bus 420 supports input/output (I/O) communications by providing a communication path between electronic circuitry of the main logic block 410 and a number I/O related devices. These I/O related devices include a transceiver device 430 (e.g., a modem), a remote command unit interface (RCU-IF) 435, a transmitter controller 440 and an external non-volatile memory element 445 (e.g., read only memory "ROM", flash memory, etc.) for storing the GUI software. RCU-IF 435 receives commands from the remote control (not shown), and decodes the commands to produce GUI request signals (IRQs) corresponding to these commands. Each IRQ is transferred to the CPU within the main logic block 410.

Transmitter controller 440 provides a communication mechanism so that IRD 310 is able to communicate with an analog VCR (not shown) via a remote transmitter (not shown) when one of the programs is scheduled to experience a timer event such as a timed recording. Otherwise, communications between the transmitter controller 440 and the remote transmitter 441 are disabled. Examples of the remote transmitter 441 may include, but are not limited or restricted to infrared transmitters such as those manufactured and commercially available from Matsushita of Osaka, Japan (referred to as a "VCR mouse"). External non-volatile (NV) memory element 445 is connected to extension bus 420 and contains programming data of shows or programs scheduled to be recorded or to be viewed upon purchase, and software that controls the behavior of the user interface displays based on commands from the remote control as described above.

Figure 4:
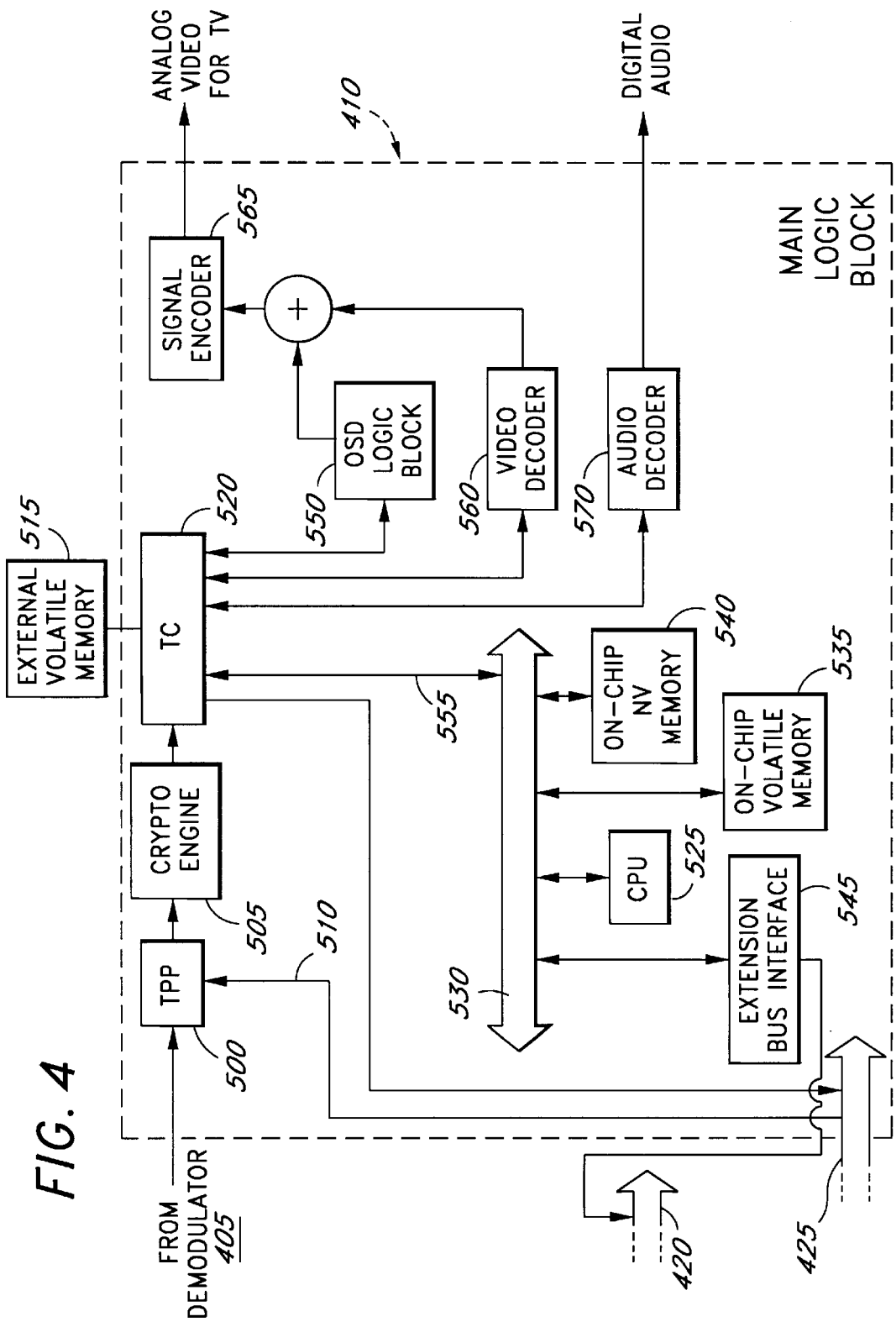
FIG. 4 is a further detailed block diagram illustrating one embodiment of the main logic block of the integrated receiver decoder of FIG. 4.

Referring now to FIG. 4, electronic circuitry of the main logic block 410 is shown. The Transport Packet Parser (TPP) 500 receives the decoded bit stream and parses the bit stream. This parsed bit stream is decrypted by a cryptographic engine 505 which may operate in accordance with a cryptographic function, for example Data Encryption Standard (DES). However, if the bit stream is received from IF 415 via communication line 510, cryptographic engine 505 will be precluded from decrypting the bit stream since it is already in a decrypted form. Thereafter, the decrypted bit stream, including the programming data, is stored in an external volatile memory 515 (e.g., random access memory "RAM") under the control of traffic controller (TC) 520.

CPU 525 controls the operations of the IRD by communicating with a plurality of elements through an internal high-speed bus 530. These elements include an optional volatile memory 535, at least one non-volatile (NV) memory element 540 (e.g., read only memory "ROM", erasable programmable read only memory "EPROM", flash memory, etc.) to contain software programs, extension bus interface 545, and traffic controller 520. NV memory element 540, in lieu of external NV memory 445 of FIG. 3, may be used to store software needed by CPU 525 (e.g., GUI software) or perhaps timer data. Extension bus interface 545 allows CPU 525 to communicate with the devices coupled to extension bus 420.

Figure 5:
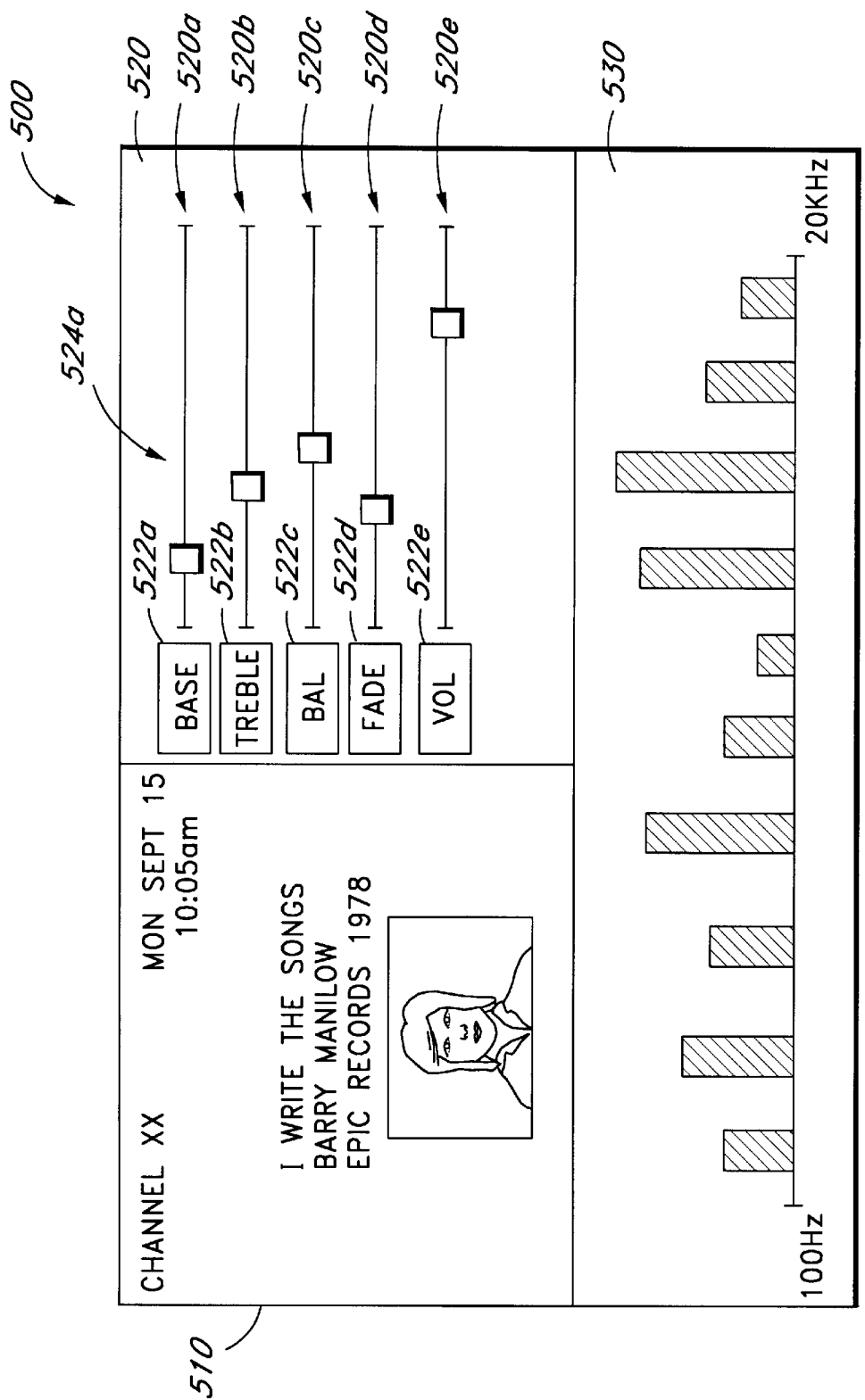
FIG. 5 illustrates one embodiment of a graphical user interface provided in accordance with the teachings of the present invention.

Referring to FIGS. 3–4, the operations performed by IRD 310 to support an electronic GUI screen for controlling audio parameters corresponding to music provided via a desired music channel, are described. As the user selects a particular broadcast music channel via the remote control (e.g., by depressing the "select" button of the remote control), CPU 525 causes the front-end unit 400 to tune to receive and display audio and video information associated with the broadcast music channel. In one embodiment, the RCU-IF 435 receives a first command from the remote control (e.g., when the user depresses the "select" button of the remote control), and transfers a first GUI request signal (IRQ1) directly to CPU 525 or indirectly through a queuing mechanism. In response to detecting IRQ1, CPU 525 executes GUI software contained in external NV memory element 445 (or NV memory element 540) and services IRQ1 by signaling the front-end unit 400 to tune to the broadcast channel of the current-broadcast music channel and to display the electronic GUI screen on the TV receiver 320. An example of the electronic GUI screen is shown in FIG. 5.

More specifically, CPU 525 executes GUI software, normally coded to control an on-screen display (OSD) logic block 550, to produce the electronic GUI screen of the present invention for the corresponding selected channel. The first operation involves CPU 525 signaling traffic controller 520, via communication line 555, to retrieve at least programming data contained in external volatile memory 515 and route the programming data to OSD logic block 550. Next, CPU 525 controls OSD logic block 550 to decompress the programming data in accordance with a recognized video format and to produce (for display) the electronic GUI screen in a manner well-known in the art. In general, the programming data is processed as a bitmap to overlay appropriate grids forming the layout of the electronic GUI screen.

The electronic GUI screen may be superimposed over video by mixing the electronic GUI screen with video output from video decoder 560. The video and audio output are received by main logic block 410 and decompressed in accordance with Moving Picture Experts Group (MPEG), Joint Picture Experts Group (JPEG) or any other video decompression function. Alternatively, the electronic GUI screen may be superimposed over a still background. In any event, the resulting mixed video output is transferred to signal encoder 565. Signal encoder 565 converts the mixed video output into an analog signal having a recognized video format such as NTSC, PAL, SECAM and the like. Similarly, audio output is transferred to audio decoder 570, which converts the audio output into a digital signal.

Upon reviewing the status of the audio parameters shown on the electronic GUI screen, the user may adjust the status of the audio parameters. To accomplish this, the user issues a second command through the remote control 315 to select of one of a plurality of audio parameters, such as base, treble, balance, fade and volume. Upon RCU-IF 435 receiving the second command from the remote control 315 (e.g., by user depressing "channel select" button or the CHAN+ or CHAN− keys, of the remote control), RCU-IF 435 transfers a second GUI request signal (IRQ2). In response to detecting IRQ2, CPU 525 executes GUI software and services IRQ2 by highlighting the selected parameter.

Upon selection of one of the audio parameters, the user may utilize a set of keys in the remote control 315, such as the volume control keys (VOL+ and VOL− keys) to facilitate adjustment of the audio parameters. Upon setting the desired values for a selected audio parameter, the user may utilize the remote control 315 to issue another command to select a further audio parameter for adjustment.

FIG. 5 illustrates one embodiment of an electronic graphical user interface screen provided in accordance with the teachings of the present invention. The screen 500 includes a first portion 510 for displaying textual information associated with the currently broadcast music. The first portion 510 may also include graphical information regarding the artist or the album. A second portion 520 includes a plurality of audio parameter selection options, 520*a–e*, each of which includes a parameter description 522*a–e* of the audio parameter, such as "base", "treble", "balance", "fade" and "volume". Located adjacent to each parameter description (e.g., 522*a*) is an illustration of the adjustment range of the associated parameter (e.g., 524*a*). The user may utilize the volume keys (e.g., VOL+ and/or VOL− keys) as described above, or any other appropriate keys or mechanism, to adjust the associated audio parameter. Adjustment of these parameters enable the user to control the various audio features of the song that is currently being broadcast. A third portion 530 of the screen 500 includes a spectrum analysis display of the broadcast music. The spectrum analysis display provides information to the user for adjusting the various audio parameters of the broadcast music.

It is contemplated that other operations, besides adjustment of audio parameters, may be configured for adjustment during viewing of the electronic GUI screen or another electronic display screen. For example, the channel settings (such as channel number) and video settings (such as brightness, color and tint) may be respectively selected and/or changed.

For example, upon RCU-IF 435 receiving a corresponding command from the remote while an electronic GUI screen associated with a particular music channel displayed, RCU-IF 435 transfers a corresponding GUI request signal (IRQX). In response to detecting IRQX, CPU 525 executes GUI software, also contained in external NV memory element 445, to service IRQX by generating one or more subsequent display screens (not shown) overlaid over the current electronic GUI screen or substituted for the current electronic GUI screen, for selection and/or adjustment of the corresponding channel or video settings.

The present invention thus provides a graphical user interface for use with a music channel, so that user interactivity and control of various audio features of audio information that is being broadcast, may be facilitated.

The present invention described herein may be designed in many different embodiments and using many different configurations. As discussed herein, the architecture of the IRD is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. An entertainment system, comprising:
    a broadcast receiver capable of receiving at least one video and audio program and at least one audio only program, the broadcast receiver generating a mixed video output corresponding to a video signal superimposing on one of the at least one video and audio program and at least one audio only program; and
    a display monitor coupled to the broadcast receiver, having a screen display associated with the mixed video signal, comprising;
        when receiving an audio only program,
            an information area on a first portion of the display, said information area displaying textual information regarding a currently broadcast audio program from the audio only program, and a parameter area on a second portion of the display, said parameter area displaying a status of a parameter corresponding to said currently broadcast audio program, and an adjustment mechanism for adjusting said status of said parameter, said parameter area being updated by the adjustment mechanism to display the corresponding adjusted status of said parameter.

when receiving a video and audio program, a display area on a least part of the display displaying the video.

2. The entertainment system of claim 1, wherein the display monitor includes a television receiver.

3. The entertainment system of claim 1, wherein the broadcast receiver includes an integrated receiver decoder.

4. The entertainment system of claim 1, further comprising:

a plurality of memory elements, and a central processing unit coupled to the plurality of memory elements, the central processing unit executing software to assist the broadcast receiver in loading programming data associated with the at least one video and audio program and at least one audio only program into one of the plurality of memory elements along with information indicating whether the status of the parameter is to be adjusted.

5. The entertainment system of claim 4, wherein the central processing unit of the broadcast receiver executes software to provide said screen display.

6. The entertainment system of claim 1, wherein said parameter is an audio parameter selected from a group consisting of: volume, balance, treble, bass and fade.

7. The entertainment system of claim 1, wherein said parameter area further displays a status of a second parameter corresponding to said currently broadcast audio program.

8. The entertainment system of claim 1, wherein said screen display further comprises a spectral analysis area that displays a spectral analysis of said currently broadcast audio program.

9. The entertainment system of claim 1, wherein said information area further displays graphical information related to the currently broadcast audio program.

10. The entertainment system of claim 1, wherein said parameter area further displays an adjustment range for adjusting said status of said parameter.

11. A method for selectively adjusting a parameter of a currently broadcast audio program, comprising:

receiving the currently broadcast audio program from a broadcast receiver, the broadcast receiver being capable of receiving at least one video and audio program and at least one audio only program;

generating a mixed video output corresponding to a video signal superimposing on one of the at least one video and audio program and at least one audio only program;

displaying, in a information area on a first portion of a screen display of a display monitor, textual information regarding the currently broadcast audio program from the currently broadcast audio only program, the screen display being associated with the mixed video output;

displaying, in a parameter area on a second portion of the display, a status of the parameter corresponding to said currently broadcast audio only program;

adjusting said status of said parameter; and updating said parameter area to display the corresponding adjusted status of said parameter.

12. The method of claim 11, wherein receiving comprises receiving a digital bit stream including programming data and sensory data corresponding to the at least one video and audio program and at least one audio only program.

13. The method of claim 11, further comprising: executing software by a central processing unit to assist the broadcast receiver in loading programming data associated with the at least one video and audio program and at least one audio only program into a memory element along with information indicating whether the status of the parameter is to be adjusted.

14. The method of claim 13, further comprising executing software by the central processing unit, implemented within the entertainment system, to produce said screen display.

15. The method of claim 11, wherein said parameter is an audio parameter selected from a group consisting of: volume, balance, treble, bass and fade.

16. The method of claim 11, further comprising: displaying status of a second parameter corresponding to said currently broadcast audio program.

17. The method of claim 11, further comprising: displaying, in a spectral analysis area, a spectral analysis of said currently broadcast audio program.

18. The method of claim 11, further comprising: displaying, in said information area, graphical information related to the currently broadcast audio program.

19. The method of claim 11, further comprising: displaying, in said parameter area, an adjustment range for adjusting said status of said parameter.

20. The method of claim 11, further comprising receiving at least programming data associated with the the at least one video and audio program and at least one audio only program.

* * * * *